United States Patent
Bruning et al.

(10) Patent No.: US 9,544,330 B1
(45) Date of Patent: Jan. 10, 2017

(54) METHOD OF SECURING MANAGEMENT INTERFACES OF VIRTUAL MACHINES

(71) Applicant: Sprint Communications Company L.P., Overland Park, KS (US)

(72) Inventors: Troy S. Bruning, Olathe, KS (US); John C. Hudson, Lee's Summit, MO (US); Matthew Hund, Olathe, KS (US); Bruce Keith, Raymore, MO (US); Michael Winslow, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 247 days.

(21) Appl. No.: 14/452,530

(22) Filed: Aug. 6, 2014

(51) Int. Cl.
| | | |
|---|---|---|
| *G06F 11/00* | (2006.01) | |
| *G06F 12/14* | (2006.01) | |
| *G06F 12/16* | (2006.01) | |
| *H04L 29/06* | (2006.01) | |
| *G06F 9/455* | (2006.01) | |

(52) U.S. Cl.
CPC ....... *H04L 63/1458* (2013.01); *G06F 9/45533* (2013.01)

(58) Field of Classification Search
CPC ................................................. H04L 63/1458
USPC ......................................................... 726/22
See application file for complete search history.

(56) References Cited

U.S. PATENT DOCUMENTS

| | | | |
|---|---|---|---|
| 2004/0030773 A1 | 2/2004 | Espinoza-Ibarra | |
| 2005/0076107 A1 | 4/2005 | Goud et al. | |
| 2006/0031448 A1 | 2/2006 | Chu et al. | |
| 2007/0047195 A1 | 3/2007 | Merkin et al. | |
| 2008/0022148 A1 | 1/2008 | Barnea et al. | |
| 2013/0121207 A1* | 5/2013 | Parker .................... | H04L 67/10 370/254 |
| 2013/0275543 A1* | 10/2013 | Jain ....................... | G06F 15/167 709/213 |
| 2014/0098813 A1* | 4/2014 | Mishra ................. | H04L 12/185 370/390 |
| 2014/0098815 A1* | 4/2014 | Mishra ................. | H04L 45/021 370/390 |
| 2014/0304810 A1* | 10/2014 | Khanal ............... | H04L 63/0428 726/22 |
| 2015/0085868 A1* | 3/2015 | Snyder, II ........... | G06F 9/45558 370/401 |
| 2015/0341466 A1* | 11/2015 | Sah ....................... | H04L 67/327 707/770 |
| 2016/0078342 A1* | 3/2016 | Tang ..................... | H04L 41/00 706/47 |

* cited by examiner

*Primary Examiner* — Morshed Mehedi
*Assistant Examiner* — Khalil Naghdali

(57) ABSTRACT

A virtual server set is disclosed, comprising one or more virtual servers for processing user requests, the virtual server set comprising, at least a first processor and a second processor, a memory, a first switch running on the first processor, the first switch to manage a control plane, and, a second switch running on the second processor, to manage a signaling plane and a bearer plane.

18 Claims, 3 Drawing Sheets

METHOD OF SECURING MANAGEMENT INTERFACES OF VIRTUAL MACHINES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A virtual server set may be designated to address user requests. Such a server set will typically include a plurality of processors, a memory, and a virtual switch to manage the input/output routing of the requests, as well as control management of the virtual server set. A data communication switch may be used in a computer network to communicatively couple devices on the network. For example, a switch may route a message to a selected server computer, host, or processor based on a media access control (MAC) address contained as a destination address in the message. In some contexts, the data communication switch may be said to provide packet switching functions.

Denial-of-Service attacks (DoS attacks) are designed to overwhelm the ability of a virtual server set to address user requests. That is, requests are sent in at such a fast rate that the virtual server set assigned to handle the requests cannot keep up, for example has little or no remaining time for handling legitimate requests. The goal of such attacks may be to cause a partial or complete shutdown of the virtual server set.

SUMMARY

In an embodiment, a virtual server set is disclosed, comprising one or more virtual servers for processing user requests, the virtual server set comprising, at least a first processor and a second processor, a memory, a first switch running on the first processor, the first switch to manage a control plane, and, a second switch running on the second processor, to manage a signaling plane and a bearer plane.

In another embodiment, a method is disclosed of protecting a virtual set of servers from a denial of service attack, the method comprising managing a control plane of the virtual set of servers with a first virtual switch, and, managing a signaling plane of the virtual set of servers and a bearer plane of the virtual set of servers with a second virtual switch.

In another embodiment, an apparatus is disclosed for managing a denial of service attack on a virtual server set, the apparatus comprising a router, a first input/output port operably coupled to the router and handing a bearer plane and a signaling plane, a second input/output port operably coupled to the router and handling a control plane, and, a virtual server set, the virtual server set comprising a plurality of processors, a memory, a data virtual switch operably coupled to the first input/output port, and, a control virtual switch operably coupled to the second input/output port.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
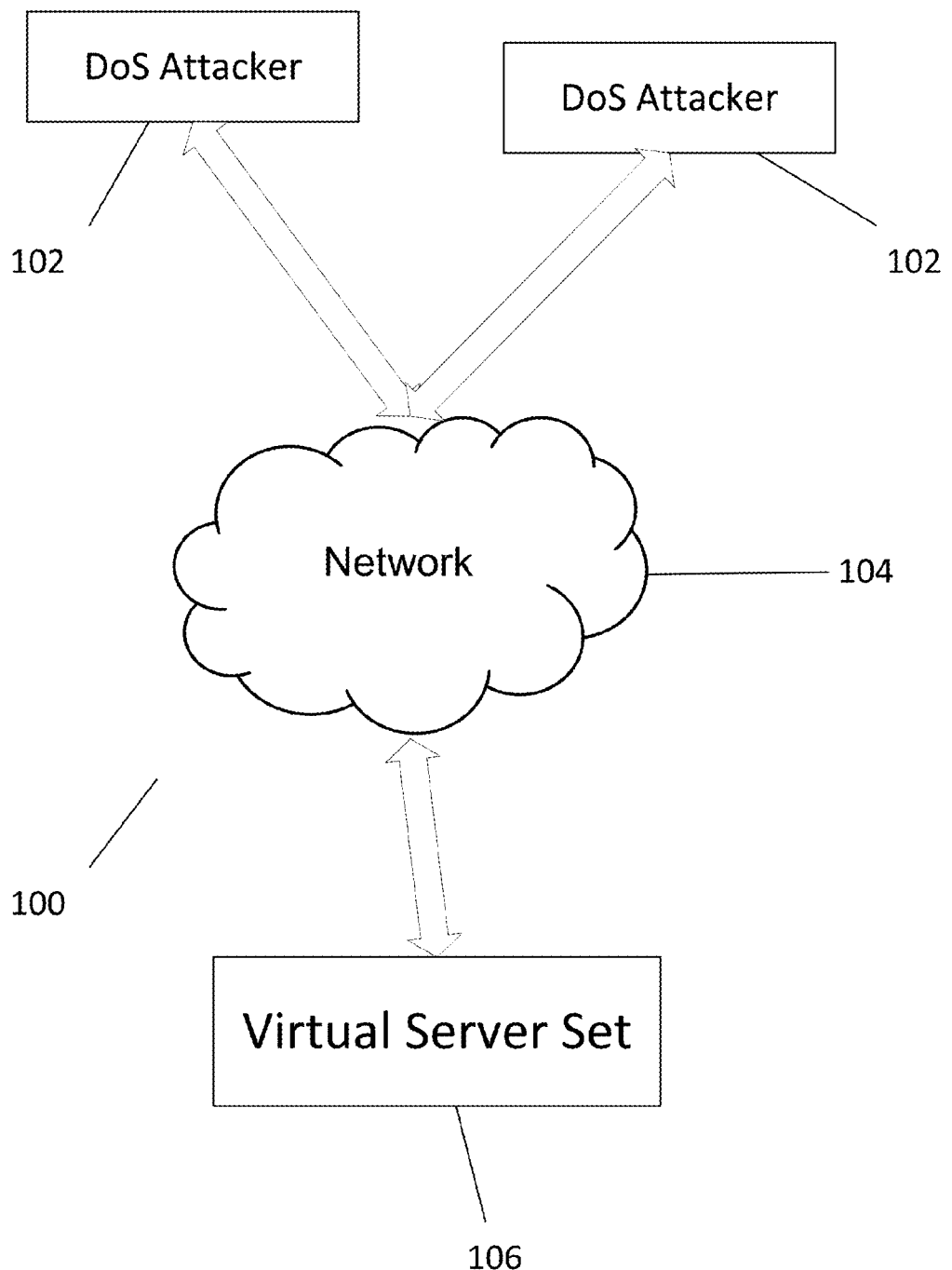
FIG. 1 is an illustration of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

It is common nowadays for high volume requests to be handled with a virtual server set. That is, a group of physical servers which work together on a virtual plane as a single unit. Such a virtual server set may be housed in a blade center, the blade center comprising a plurality of processor blades. The processor blades are tied together via a back plane. In some contexts herein, the blade center may be referred to as a blade server.

Input and output to and from the virtual server set may be passed through a virtual switch. The virtual switch may reside on its own processor and/or its own server. A single virtual switch may handle multiple planes, including the bearer plane, the signaling plane and the control plane (the bearer plane and the signaling plane are both considered user planes). In routing, the control plane may be part of the router architecture that is concerned with drawing the network map, or the information in a (possibly augmented) routing table that defines what to do with incoming packets. Control plane logic also can define certain packets to be discarded, as well as preferential treatment of certain packets for which a high quality of service is defined by such mechanisms as differentiated services. The control plane may also shut down ports. The bearer plane (or user plane) handles the actual content that a user wishes to transmit to and from the virtual server set. The signaling plane handles the signaling instructions regarding routing information that is part of a request message.

In computing, a denial-of-service (DoS) or distributed denial-of-service (DDoS) attack is an attempt to make a machine or network resource unavailable to its intended users. Although the means to carry out, motives for, and targets of a DoS attack may vary, it generally consists of efforts to temporarily or indefinitely interrupt or suspend services of a host connected to the Internet. As clarification, DDoS (Distributed Denial of Service) attacks are sent by two or more persons, or bots. DoS (Denial of Service) attacks are sent by one person or system.

Perpetrators of DoS attacks typically target sites or services hosted on high-profile web servers such as banks, credit card payment gateways, and even root nameservers. DoS threats are also common in business, and are sometimes responsible for website attacks. One common method of attack involves saturating the target machine with external communications requests, so much so that it cannot respond to legitimate traffic, or responds so slowly as to be rendered essentially unavailable. Such attacks usually lead to a server overload.

In general terms, DoS attacks are implemented by either forcing the targeted computer(s) to reset, or consuming its resources so that it can no longer provide its intended service or obstructing the communication media between the intended users and the victim so that they can no longer communicate adequately.

One challenge presented by a DoS attack is for an operator of the virtual server set to regain control. The control plane may be used to regain control, by shutting off ports that attacks are coming in through, or identifying and deleting the incoming problem packets. Getting the control plane to do this may be more difficult because the control plane, the bearer plane and the signaling plane may all be flowing through a single virtual switch that is now over-run. To address this, some blade centers that run virtual server sets have a back door access port, for example an RS232 serial port, or an ILO (Integrated Lights Out) Ethernet port, or similar ports that can be used to regain control. These back door ports tend to be inherently much slower than the other ports, and one may not be able to regain control via these alternates, and may instead have to shut down and restart the virtual server set. To make it easier and quicker to regain control, it is preferable to have the control plane still function adequately, even in the midst of a DoS attack.

To accomplish this, instead of one virtual switch to handle all three planes, the present disclosure teaches adding a second virtual switch designated for the control plane, while the bearer plane and the signaling plane (e.g., the two user planes) still go through the first virtual switch. Thereby, when the DoS attack happens, the second virtual switch is unaffected, and the control plane can still manage the virtual server set. The first virtual switch will execute on a first processor and the second virtual switch will executed on a second processor. For example, both switches may preferably be executed on different processor blades. Alternatively, in an embodiment, the first virtual switch may be executed on a first processor (e.g., a first CPU) of a blade server and the second virtual switch may be executed on a second processor (e.g., a second CPU) of the same blade server. Each of the virtual switches will couple to a plurality of the blade processors in the blade center, for example via a backplane of the blade center.

Referring now to FIG. 1, a schematic diagram of a system 100 is shown. A DoS attacker 102 is shown, sending messages through the network 104 to a virtual server set 106. The form and content of the attack can vary widely, as is well known in the art, such as Internet Control Message Protocol (ICMP) flood, SYN flood, teardrop attacks, Nukes, R-U-Dead-Yet?, Slow Read, and numerous others. The attack may also be a DDoS (Distributed Denial of Services), in which multiple machines attack at once. As shown in FIG. 1, there can be multiple DoS attackers 102. While shown here as two attackers, there can in fact be any number, either knowingly or unknowingly working together in the attack.

Figure 2:
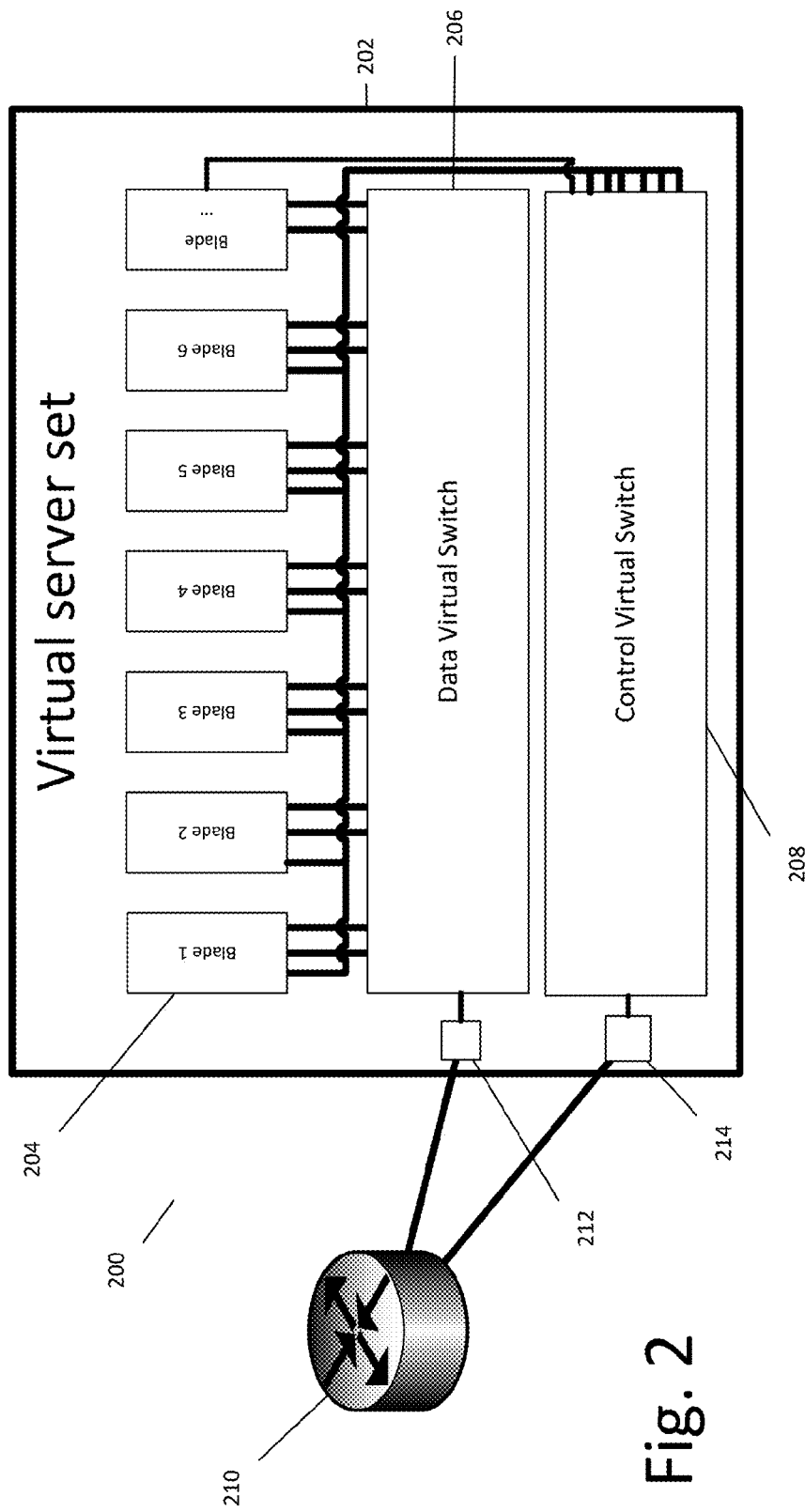
FIG. 2 is a schematic diagram illustrating an apparatus according to an embodiment of the disclosure.

Referring now to FIG. 2, a schematic diagram of a method 200 is shown. A virtual server set 202 comprises a number of blade processors, exemplified by 204. There may be any number of blade processors in the virtual server set 202. Being virtual, they do not all have to reside in a common location, though they could. For instance, they may comprise a set of blades in a common rack in a blade center.

Coupled to each blade 204 is a data virtual switch 206. The data virtual switch 206 handles the bearer and signaling planes coming in to the virtual server set 202. The data virtual switch 206 preferably executes on its own processor. Also coupled to each blade 204 is a control virtual switch 208. The control virtual switch 208 handles the control plane, and thereby manages each of the blades 204. The control virtual switch 208 also preferably executes on its own processor (a processor separate from the processor on which the data virtual switch 206 executes).

A router 210 sends messages and packets to the virtual server set 202. The incoming user messages and packets are routed to the data virtual switch 206, via an input/output (I/O) port 212. The control management commands are routed to the control virtual switch 208 via a different I/O port 214. The I/O port 212 may be referred to as a first I/O port 212; the I/O port 214 may be referred to as a second I/O port 214. The control commands may also preferably come from a different or additional source, so as not to be tied to the router 210.

Configured thus, incoming messages, data requests, etc., coming from users are routed by the router 210 to I/O port 212, to the data virtual switch 206. The data virtual switch 206 then selects which blade processor 204 to send the request to. The response from the blade processor 204 then flows back through the same route in reverse, to return the response to the user. Incoming control commands come in through the router 210, I/O port 214, and into the control virtual switch 208. The control virtual switch 208 then acts on the commands with regard to blades 204.

When a DoS attack begins, all the content coming in from the attacker is routed by the router 210 in through I/O port 212 and through data virtual switch 206. If the blades 204 start to bog down or experience problems, an operator of the virtual server set 202 may be notified, and that person in turn may send in commands via the control virtual switch 208 to manage the blades 204 or the I/O ports 212 and 214 as needed. For example, an administrator may send commands via the control virtual switch 208 to perform maintenance on the virtual server set 202 and/or on one or more of the blades 204. The administrator or another may send commands via the control virtual switch 208 to change one or more Internet protocol (IP) addresses associated with the virtual server set 202 and/or one or more of the blades 204. As can be seen, this system allows the operator to still use the relatively high-speed control virtual switch 208 as they normally would, and thereby address the DoS attack as desired.

Figure 3:
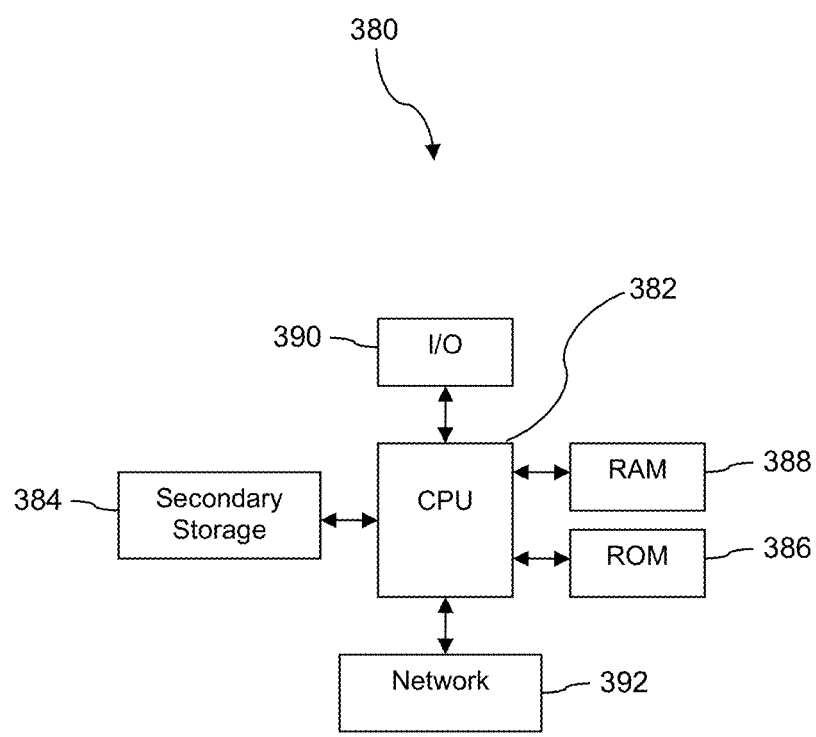
FIG. 3 is a block diagram of a computer system according to an embodiment of the disclosure.

FIG. 3 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An apparatus for managing a denial of service attack on a virtual server set, the apparatus comprising:
    a router;
    a first input/output port operably coupled to the router and a data virtual switch handling a bearer plane and a signaling plane;
    a second input/output port operably coupled to the router and a control virtual switch handling a control plane; and
    a virtual server set, the virtual server set comprising:
        a plurality of blade processors,
        a memory,
        the data virtual switch operably coupled between the first input/output port and the plurality of blade processors, wherein the data virtual switch receives incoming user messages and packets from the router via the first input/output port, and
        the control virtual switch operably coupled between the second input/output port and the plurality of blade processors, wherein the control virtual switch is routed control management commands via the second input/output port and manages each of the plurality of blade processors via the control management commands independent of the data virtual switch, and wherein the control plane controls a port, the port allowing input and output through the data virtual switch.

2. The apparatus of claim 1, wherein the virtual server set is housed in a blade center, the blade center comprising the plurality of blade processors.

3. The apparatus of claim 2, wherein the virtual server set comprises less than all the blade processors in the blade center.

4. The apparatus of claim 2, wherein the data virtual switch runs on a first processor and the control virtual switch runs on a second processor, and wherein the first processor and the second processor are blade servers.

5. The apparatus of claim 2, wherein the control plane manages all blade servers in the blade center.

6. The apparatus of claim 1, wherein control virtual switch closes a port through which the denial of service attack is coming in.

7. A method of protecting a virtual server set from a denial of service attack, the method comprising:
    prior to detecting a denial of service attack,
        managing a control plane of the virtual server set with a control virtual switch by routing control management commands on the control plane via the control virtual switch, wherein the virtual server set comprises the control virtual switch, a data virtual switch, and a plurality of blade processors; and
        managing a signaling plane of the virtual server set and a bearer plane of the virtual server set with the data virtual switch by routing user messages and packets from a router on the signaling plane and the bearer plane via the data virtual switch; and
    in response to detecting the denial of service attack, controlling, by the control virtual switch via the control plane, at least one of a plurality of blade processors via control management commands independent of the data virtual switch, wherein the control plane controls a port, the port allowing input and output through the data virtual switch.

8. The method of claim 7, wherein the control virtual switch is housed on a first processor.

9. The method of claim 7, wherein the data virtual switch is housed on a second processor.

10. The method of claim 7, further comprising using the control virtual switch to input management commands to close a port through which the denial of service attack is coming in.

11. The method of claim 7, wherein the denial of service attack is a distributed denial of service attack.

12. The method of claim 7, wherein the signaling plane, the bearer plane, and the control plane all come into the virtual server set via the router.

13. The method of claim 7, wherein the signaling plane and the bearer plane come into the data virtual switch via a first input/output port, and the control plane comes into the virtual server set via a second input/output port.

14. A virtual server set comprising one or more virtual servers for processing user requests, the virtual server set comprising:
   at least a first processor and a second processor;
   a memory;
   a control virtual switch running on the first processor, the control virtual switch to manage a control plane, wherein the control virtual switch is routed control management commands via an first input/output port and manages each of a plurality of blade processors independent of a data virtual switch; and
   the data virtual switch running on the second processor, the data virtual switch to manage a signaling plane and a bearer plane, wherein the data virtual switch receives incoming user messages and packets from a router via a second input/output port, and wherein the control plane controls a port, the port allowing input and output through the data virtual switch.

15. The virtual server set of claim 14, wherein the virtual server set is housed in a blade center, the blade center comprising the plurality of blade processors.

16. The virtual server set of claim 15, wherein the virtual server set comprises less than all the blade processors in the blade center.

17. The virtual server set of claim 15, wherein the first processor and the second processor are blade servers.

18. The virtual server set of claim 15, wherein the control plane manages all blade servers in the blade center.

* * * * *